United States Patent
Roman et al.

(10) Patent No.: US 10,841,820 B2
(45) Date of Patent: Nov. 17, 2020

(54) METHOD AND TEST SYSTEM FOR MOBILE NETWORK TESTING AS WELL AS PREDICTION SYSTEM

(71) Applicant: Rohde & Schwarz GmbH & Co. KG, Munich (DE)

(72) Inventors: Miguel Angel Roman, Munich (DE); David Gonzalez, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/242,840

(22) Filed: Jan. 8, 2019

(65) Prior Publication Data

US 2019/0246297 A1    Aug. 8, 2019

(30) Foreign Application Priority Data

Feb. 7, 2018   (EP) .................................... 18155621

(51) Int. Cl.

| | |
|---|---|
| *H04W 24/00* | (2009.01) |
| *H04W 24/08* | (2009.01) |
| *H04L 12/24* | (2006.01) |
| *H04W 24/06* | (2009.01) |
| *H04L 12/26* | (2006.01) |
| *G06N 3/04* | (2006.01) |

(52) U.S. Cl.
CPC ......... *H04W 24/08* (2013.01); *H04L 41/5009* (2013.01); *H04L 43/0805* (2013.01); *H04L 43/50* (2013.01); *H04W 24/06* (2013.01); *G06N 3/04* (2013.01); *H04L 41/16* (2013.01)

(58) Field of Classification Search
CPC ..... H04W 24/02; H04W 24/06; H04W 24/10; H04W 36/0061; H04W 4/023; H04W 4/029; H04W 64/006; H04W 8/02
USPC ............ 455/423, 422.1, 436, 424, 433, 437, 455/115.1, 67.13, 449, 456.1, 466, 435.1, 455/67.11
See application file for complete search history.

(56) References Cited

U.S. PATENT DOCUMENTS

| | | | |
|---|---|---|---|
| 8,249,598 B1 * | 8/2012 | Khanka | H04W 36/0061 370/320 |
| 9,888,353 B2 * | 2/2018 | Reed | H04W 8/02 |
| 2013/0225229 A1 | 8/2013 | Al-Shalash | |

(Continued)

OTHER PUBLICATIONS

Price, T., and Lerba, E., "Machine Learning to Disable Applications from Using Background Resources Except at Appropriate Times," iip.com Prior Art Database Technical Disclosure, Dec. 2017, 36 pages.

*Primary Examiner* — Joseph Arevalo
(74) *Attorney, Agent, or Firm* — Christensen O'Connor Johnson Kindness PLLC (57) ABSTRACT

A method for mobile network testing is described wherein at least one testing device is used that is configured to be connected to a mobile network. A predefined set of test procedures is run on the at least one testing device in order to obtain binary test results assigned to at least one test parameter. The binary test results of the test procedures are evaluated via a machine learning model. The machine learning model is trained to predict the probability of at least one binary test result based on the binary test results obtained. Further, a test system, a method for mobile network testing as well as a prediction system are described.

15 Claims, 3 Drawing Sheets

(56) References Cited

U.S. PATENT DOCUMENTS

| | | | |
|---|---|---|---|
| 2015/0104821 A1* | 4/2015 | Goetz | G16B 40/00 |
| | | | 435/29 |
| 2015/0161386 A1* | 6/2015 | Gupta | G06F 11/3612 |
| | | | 726/23 |
| 2015/0286507 A1* | 10/2015 | Elmroth | G06F 11/3442 |
| | | | 718/104 |
| 2015/0373565 A1 | 12/2015 | Safavi | |
| 2016/0069919 A1* | 3/2016 | Holmes | G01N 35/0092 |
| | | | 506/2 |
| 2016/0148850 A1* | 5/2016 | David | H01L 22/20 |
| | | | 438/5 |
| 2016/0210224 A1* | 7/2016 | Cohen | G06F 9/44589 |
| 2016/0373944 A1* | 12/2016 | Jain | H04L 43/50 |
| 2017/0316381 A1* | 11/2017 | Dawson, Jr. | G06Q 10/1053 |
| 2019/0209116 A1* | 7/2019 | Sjostrand | A61B 6/5217 |

\* cited by examiner

METHOD AND TEST SYSTEM FOR MOBILE NETWORK TESTING AS WELL AS PREDICTION SYSTEM

FIELD OF THE DISCLOSURE

Embodiments of the present disclosure relate to a method for mobile network testing, a test system for mobile network testing as well as a prediction system for predicting the probability of at least one binary test result.

BACKGROUND

Nowadays, telecommunication networks as well as network communication itself increase so that testing of mobile networks becomes more and more important. So far, operators have to run certain drive testing campaigns with special testing equipment in order to test the mobile network(s). The drive testing campaigns simulate the behavior of mobile subscribers within the mobile network(s) under test wherein the behavior relates to calls, web browsing and/or video playing.

While running the drive testing campaigns, the special testing equipment records network measurements wherein the data recorded is used to determine the quality of the network for certain services used within the network, in particular the quality of experience of the mobile subscribers with regard to the respective services used. For example, the quality of the network is assigned to the drop call rate being a network key parameter indicator wherein the drop call rate corresponds to the number of calls dropping during the tests by the total number of calls. Typically, this rate is very low, for instance between 1-5%, so that a large number of calls has to be done for obtaining a testing results that is statistically significant.

In addition, other network key parameter indicators used for determine the quality of the network for certain services have to be investigated in a similar manner, namely in a statistical manner so that a lot of tests are required.

Thus, several testing campaigns have to be run (very often due to the statistical significance) in order to obtain the desired information or rather to obtain sufficient data to evaluate the quality of several services, in particular the quality of experience of the mobile subscribers with regard to the several services. Thus, a lot of efforts are required in order to obtain the data or rather information required to test a mobile network sufficiently.

Accordingly, there is a need for a simpler and cost-efficient possibility to obtain the data or rather information required in an easier manner so that mobile network testing can be improved.

SUMMARY

Embodiments of the present disclosure provide a method for mobile network testing by using at least one testing device configured to be connected to a mobile network, comprising the following steps:
running a predefined set of test procedures on the at least one testing device in order to obtain binary test results assigned to at least one test parameter;
evaluating the binary test results of the test procedures via a machine learning model; and
training the machine learning model to predict the probability of at least one binary test result based on the binary test results obtained.

Further, embodiments of the present disclosure provide a test system for mobile network testing, comprising at least one testing device and a processing unit configured to run a machine learning model to be trained, wherein the processing unit is configured to receive binary test results of a set of test procedures run on the at least one testing device and to evaluate the binary test results via the machine learning model, and wherein the processing unit is configured to train the machine learning model to predict the probability of at least one binary test result based on the test results obtained.

The present disclosure is based on the finding that the network testing can be simplified by using deep learning models such as a machine learning model in order to predict the probability of at least one binary test result. Hence, the time spent for mobile network testing can be reduced significantly once the machine learning model has been trained as the number of tests may be reduced due to the fact that the statistical significance is no more required in contrast to real tests.

The training of the machine learning model may correspond to a supervised learning as the machine learning is done with labeled training data that may consist of a set of training examples corresponding to the test results obtained. Each training example may correspond to a pair consisting of a certain input object (input parameter) as well as a desired output parameter that is also called supervisory signal, namely the binary test result or rather the appropriate scoring. The supervised learning algorithm used by the machine learning model analyzes the training data and generates an inferred mathematical model, for instance a function, which can be used for mapping new examples that go beyond the training examples.

Generally, the at least one binary test result corresponds to a test result classified into two groups on the basis of a classification rule. For instance, the binary test results is assigned to the groups "TRUE" and "FALSE", "PASS" and "FAIL" or rather "POSITIVE" and "NEGATIVE". The at least one binary test result may be assigned to the quality of a respective service, for example a mobile service.

For instance, a drop call rate is defined by binary test results as the calls are dropped or not so that the drop call rate can be classified by two groups.

In general, the quality of the service (QoS) defined by the prediction of the probability of at least one binary test result may relate to the quality of experience of the network participants (users of the network under test). For instance, the quality of the service (QoS) is standardized by IEEE 802.1p.

The (network) service may generally relate to an application requiring data from the network to be tested such as a mobile application running on a mobile end device, for instance a service related to a video platform. Moreover, the (network) service may relate, for example, to making and/or receiving calls.

According to an aspect, the test procedures running on the at least one testing device simulate the behavior of participants of the mobile network, for example wherein calls, web browsing, video playing and/or downloads are simulated. Hence, the test procedures used for generating data evaluated for training purposes correspond to the drive testing campaigns that are run in the state of the art every time when the quality of a certain service has to be tested. However, the time spent as well as the efforts can be reduced due to the fact that the test procedures only have to run to train the machine learning model. Once the machine learning model has been trained appropriately, the testing campaigns can be reduced significantly.

The behavior of the participants of the mobile network corresponds to the mobile sub scribers behavior mentioned earlier.

Another aspect provides that the training of the machine learning model is based on the at least one test parameter, for example a series of test parameters, together with the resulting binary test results. The at least one test parameter as well as the resulting binary test results correspond to a pair consisting of a certain input parameter as well as a desired output parameter, namely the binary test results. Accordingly, a supervised learning is provided.

For example, a certain service such as making and/or receiving calls, video watching or browsing may be tested by a respective test procedure. The series of test parameters corresponding to the several test procedures are used as input parameters for the machine learning model. Together with the test parameters, the resulting binary test results that may be assigned to the qualities of the respective services tested are inputted for training purposes such that the machine learning model is enabled to generate the respective mathematical model, for instance function, used for mapping new examples going beyond the training examples.

Furthermore, the machine learning model may be trained to predict the probability of several binary test results based on the at least one test parameter. Hence, the machine learning model, as soon as it is trained, is enabled to predict the different probabilities of several binary test results even though it receives the at least one test parameter of only one test procedure. Thus, the time and the efforts required for testing the mobile network with regard to the several services can be reduced appropriately once the machine learning model is trained.

For instance, the machine learning model is trained to predict statistical information. Thus, the testing time and the efforts related thereto can be reduced significantly as no statistical significance has to be ensured by the real tests due to the machine learning model trained.

As mentioned earlier, the machine learning trained is configured to predict the probability of binary test results of the several different services (mobile network applications) without the need of running or rather using the respective application itself for evaluating the respective quality.

Another aspect provides that the test parameters are investigated over time and/or wherein geographical information is taken into account. Thus, the training, for example the test parameters used for the training, comprise time and/or geographical information. Hence, a timestamp for the respective test parameters may be provided. Moreover, topographical information as well as the position can be taken into account by the machine learning model.

For instance, the at least one test parameter corresponds to at least one network key performance indicator (KPI), for example network key performance indicators assigned to availability, health and/or performance. These network key performance indicators are the indicators typically used in telecommunication services. The availability, health and/or performance may also be called accessibility, retainability and/or quality. The accessibility or rather availability relates to the availability of the certain service, for instance if a user is enabled to set up a call and/or access certain (data) resources such as downlink and/or uplink resources. The retainability or rather health corresponds to the ability to keep the established connection whereas the quality or rather performance deals with the quality of the connection established.

According to an embodiment, the at least one test parameter corresponds to a voice call and/or data access, and/or wherein the at least one network key performance indicator corresponds to a drop call status, a fail call status, a video re-buffering status, data service accessibility, signal strength, signal to noise ratio, an interference ratio, latency, round trip time, jitter, bandwidth, throughput, failure rate, signal level and/or rebuffering. The different network key performance indicators being important depend on the respective test parameter (test scenario applied). Generally, certain network key performance indicators effect almost all services whereas other network key performance indicators are only relevant for certain services. Accordingly, the network key performance indicators being relevant depend on the respective test parameter (test scenario applied).

For example, the machine learning model is trained to take the network key performance indicator(s) into account so that the machine learning model is enabled to predict the probabilities of binary test results based on the network key performance indicator(s). For this purpose, the network key performance indicator(s) as well as the respective binary test results were inputted into the machine learning model (supervised learning).

Another aspect provides that the test results are evaluated on the testing device itself and/or wherein the test results are forwarded to a separate evaluation unit that evaluates the test results. For instance, the separate evaluation unit may be a server that is connected to the mobile network and/or the at least one testing device. Hence, the evaluation may be done internally or externally wherein this depends on the computational power of the respective device.

According to another aspect, the machine learning model is provided by a neural network, for example a feed-forward neural network. A feed-forward neural network corresponds to an artificial neural network having connections between different units wherein the information moves only in one direction from the input nodes through optional hidden nodes towards the output nodes. In contrast to recurrent neural networks, the connections of the feed-forward neural network do not form a cycle.

Generally, any neural network enabled for classifying purposes can be used.

According to an aspect, the test system is generally configured to perform a method as described above. Hence, the advantages related to the method also apply for the test system.

Moreover, embodiments of the present disclosure provide a method for mobile network testing by using at least one testing device configured to be connected to a mobile network, comprising the following steps:

providing a prediction system configured to predict the probability of at least one binary test result by running a machine learning model trained;

performing a single test on the at least one testing device;

forwarding the test result of the single test and the at least one test parameter assigned to the test result to the prediction system for evaluating the test result; and obtaining a prediction regarding the probability of at least one binary test result from the prediction system, for example wherein predictions regarding the probability of several binary test results are obtained from the prediction system.

Hence, the outcome of certain tests for at least one test parameter, namely "YES" or "NO" or rather "1" or "0", can be predicted appropriately which may be assigned to the quality of a service. This prediction can be done even though only a single test is run such that it is not necessary to run several test campaigns in order to obtain (statistically significant) information regarding the quality of the respective service.

In some embodiments, the service of which the outcome is predicted is different to the service being tested by the single test performed on the at least one testing device due to the machine learning model trained. Thus, the probability of the binary test results can be predicted by running a test (procedure) corresponding to a different service compared to the one the probability of the binary test results of which is predicted.

According to an aspect, the prediction system predicts the probability of binary test results assigned to different test parameters. Generally, the prediction system is configured to predict the probability of the binary test results for several services based on the test result(s) obtained for the test parameter(s), for example the test result(s) of the single test. This can be done as the machine learning model is trained previously in an appropriate manner. Thus, the time spent for mobile network testing with regard to services using the mobile network as well as the efforts related thereto can be reduced appropriately.

In some embodiments, one test procedure (single test procedure) performed is enough for predicting the outcome of the other test procedures due to the machine learning model trained. Accordingly, the respective service used for testing the mobile network is not run.

The test procedure may be run by using an application programming interface (API). Thus, it is not necessary to run the real application, but to make use of it.

In certain embodiments, the machine learning model used is trained by a method as defined above.

Moreover, embodiments of the present disclosure provide a prediction system for predicting the probability of at least one binary test result, for example wherein the probability of the at least one binary test result is assigned to the quality of at least one service, comprising a processing unit configured to run a machine learning model, wherein the machine learning model is trained by a method as described above and/or wherein the prediction system is configured to perform a method as mentioned above. Hence, the prediction system can be used to perform mobile network testing with regard to the quality of different services used within the mobile network in a time-efficient manner as only a single test is necessary for obtaining information regarding the quality, for example the outcome of certain tests (test results), of several services due to the machine learning model trained appropriately.

The respective test result of the single test is inputted into the machine learning model trained that outputs the probability of binary test results as output parameters of the other several services so that it is no more necessary to perform these appropriate tests. The quality of experience with respect to the different services can be predicted easily and in a time efficient manner so that the costs are reduced significantly.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
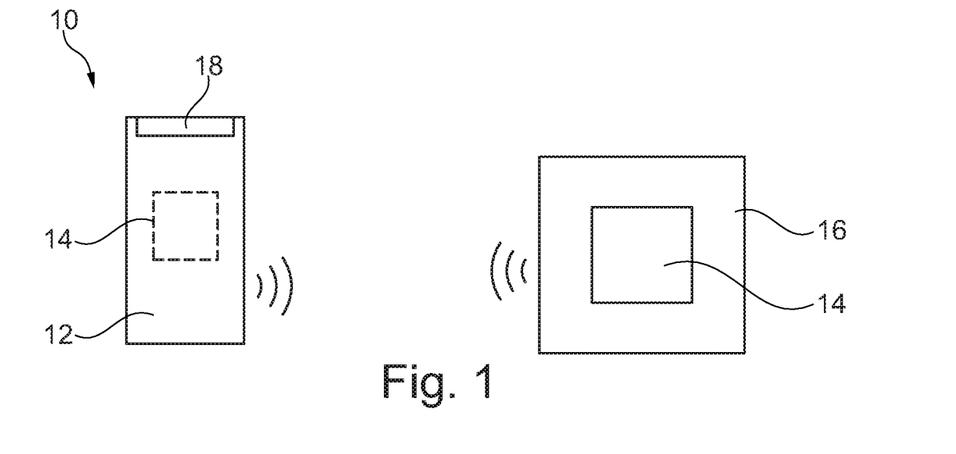
FIG. 1 schematically shows a test system for a mobile network testing according to one or more embodiments of the present disclosure.

In FIG. 1, a test system 10 for a mobile network testing is shown that comprises at least one testing device 12 as well as a processing unit 14 that is configured to run a machine learning model to be trained as will be described later with reference to FIG. 2. In the shown embodiment, the processing unit 14 is provided in a separately formed analyzing device 16.

The analyzing device 16, for example the processing unit 14, is connected to the at least one testing device 12, for instance via a wired or wireless manner as indicated in the embodiment of FIG. 1, such that the processing unit 14 receives test results of a set of test procedures run on the at least one testing device 12 for obtaining information of the network under test to which the at least one testing device 12 is connected. The at least one testing device 12 is connected to the network under test via an appropriate network interface 18 provided by an antenna unit or a cable connection, for instance.

In embodiments of the present disclosure, the processing unit 14 is generally configured to evaluate the test results received from the at least one testing device 12 wherein an appropriate machine learning model is used for evaluating purposes. The machine learning model may be, for example, established by a feed-forward neural network. A feed-forward neural network corresponds to an artificial neural network having connections between different units wherein the information moves only in one direction from the input nodes through optional hidden nodes towards the output nodes. In contrast to recurrent neural networks, the connections of the feed-forward neural network do not form a cycle. Generally, any or each neural network enabled for classifying purposes can be used. In one embodiment, the neural network is trained using a suitable technique, such as gradient descent.

Figure 2:
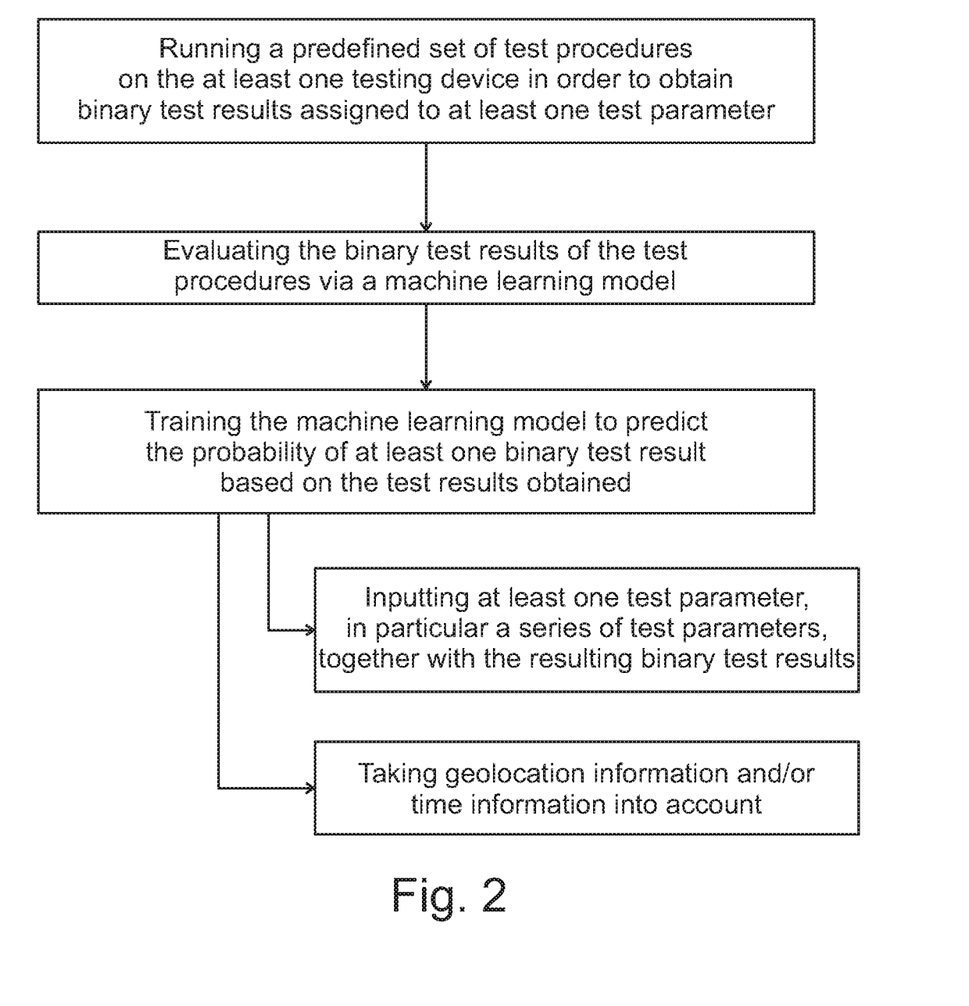
FIG. 2 shows a flowchart of a representative method for mobile network testing according to the present disclosure by using the test system of FIG. 1.

As also illustrated in FIG. 2, the test system 10, for example the processing unit 14, is configured to train the machine learning model appropriately as will be described hereinafter.

For the training purpose, a predefined set of test procedures runs on the at least one testing device 12 in order to obtain binary test results assigned to at least one test parameter, for example wherein the binary test results are assigned to a series of test parameters.

The test parameter may correspond to an at least one network key performance indicator (KPI), for instance network key performance indicators assigned to availability, health and/or performance.

In general, several test parameters or rather network key performance indicators may be recorded by the at least one testing device 12 during the test procedures or rather test scenarios applied. These test parameters or rather network key performance indicators are inter alia inputted to the machine learning model for training purpose.

The at least one test parameter may be a voice call and/or data access that may correspond to at least one specific network key performance indicator, for example to several network key performance indicators. The different network key performance indicators being important depend on the respective test parameter (test scenario applied). Generally, certain network key performance indicators effect almost all services whereas other network key performance indicators are only relevant for certain services. Accordingly, the network key performance indicators being relevant depend on the respective test parameter (test scenario applied).

For instance, the at least one network key performance indicator may correspond to a drop call status, a fail call status, a video re-buffering status, data service accessibility, signal strength, signal to noise ratio, an interference ratio, latency, round trip time, jitter, bandwidth, throughput, failure rate, signal level and/or rebuffering.

In the shown embodiment, the analyzing device 16, for example the processing unit 14, connected to the at least one testing device 12 receives the respective test results, namely the test parameter(s) or rather the corresponding network key performance indicator(s), for evaluating purposes via the machine learning model to be trained.

Hence, the analyzing device 16 corresponds to a separate evaluation unit with respect to the testing device 12, for instance a server.

The machine learning model is trained such that it is able to predict the probability of binary test results, that may be assigned to the quality of a respective service, based on the binary test results obtained by recognizing relationships and/or correlations between different data and/or information of the test parameter(s) or rather the corresponding network key performance indicator(s).

In general, the test procedures run on the at least one testing device 12 simulate the behavior of participants of the mobile network(s) under test with regard to at least one service, for instance a mobile network application. Thus, calls, web browsing, video playing and/or downloads are simulated appropriately which correspond to the typical behavior of network subscribers. The test procedures are run to obtain information regarding the binary test results of the respective service tested that are assigned to the quality of the respective service.

For the training of the machine learning model, the at least one test parameter, for example a series of test parameters, together with the resulting binary test results assigned to the quality of the respective service are used as input parameters for the machine learning model. As mentioned above, the test parameters are assigned to the predefined set of test procedures run on the at least one testing device 12 wherein network key performance indicator(s) may be used as input parameters, being assigned to the test parameter(s).

Accordingly, a supervised learning is provided as the machine learning is done with labeled training data that, consist of in some embodiments or is comprised of in other embodiments, sets of training examples used as input parameters, namely the at least one test parameter or rather the corresponding network key performance indicator(s) as well as the binary test result(s) assigned to the quality of the respective service.

In addition to the test parameters or rather the network key performance indicators, the training of the machine learning model may also take geolocation information and/or time information into account for training the machine learning model in a more accurate manner. Hence, topographic information may be encompassed. The time information ensures that time stamps are used for the respective information or rather data obtained during the testing.

In some embodiments, one or more computer-readable storage media is provided containing computer readable instructions embodied thereon that, when executed by a computing device, such as the processing unit 14, perform one or more steps of the method of FIG. 2 described above.

In general, the machine learning model is trained to predict the probabilities of several binary test results based on the at least one test parameter as will be described later with reference to FIGS. 3 and 4.

In contrast to the shown embodiment, the test results may also be evaluated on the testing device 12 itself that may comprise the processing unit 14 as indicated by the dashed lines (See FIG. 1). Hence, the processing unit 14 may be integrated in the testing device 12. However, the testing device 12 itself may require a certain computational power for being enabled to run or rather train the machine learning model directly.

Figure 3:
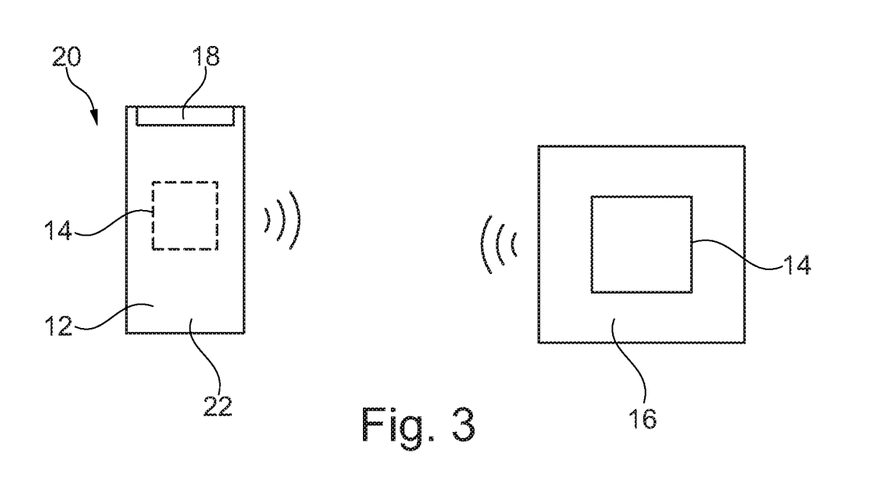
FIG. 3 schematically shows a representative embodiment of a prediction system according to the present disclosure.

In FIG. 3, a prediction system 20 is shown that comprises a testing device 22 as well as the processing unit 14 being established in an analyzing device 16.

Generally, the processing unit 14 is configured to run the machine learning model that has been trained previously as described above. Thus, the analyzing device 16 corresponds to the one shown in FIG. 1 as the respective machine learning model provided by the processing unit 14 was trained appropriately.

Further, the testing device 22 of the prediction system 20 may also correspond to the testing device 12 shown in FIG. 1 so that the same measuring equipment is used for training and measuring purposes.

Figure 4:
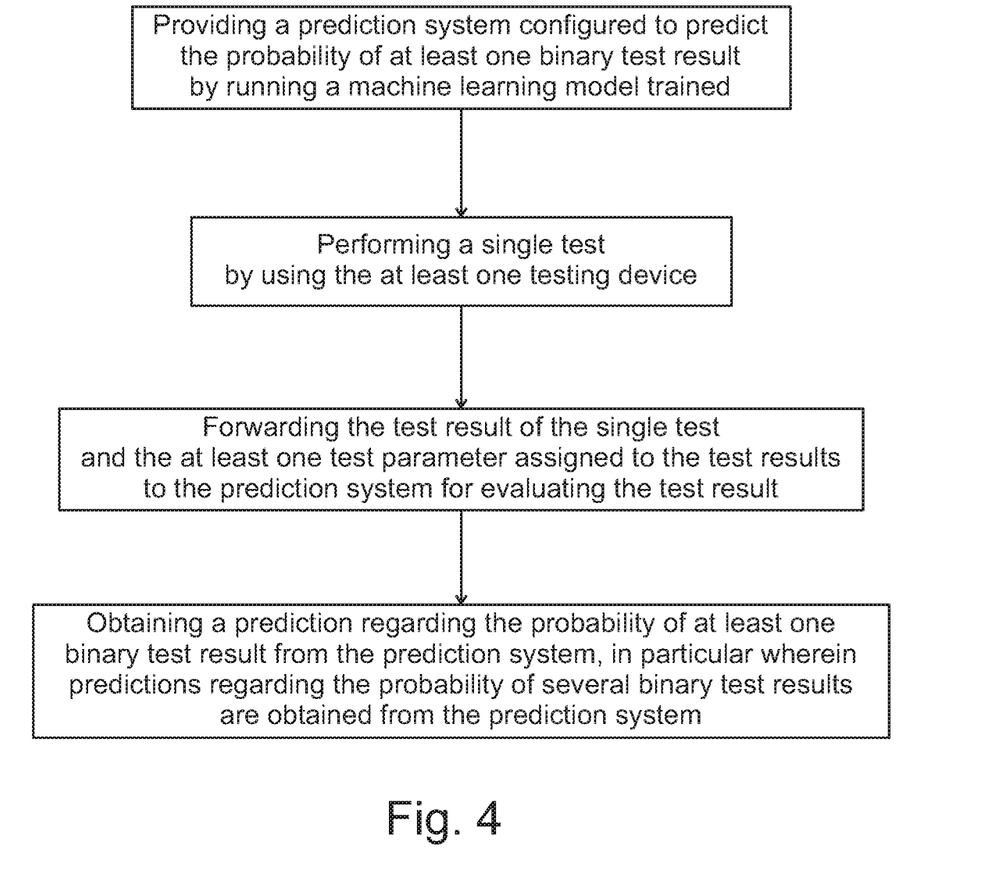
FIG. 4 shows a flowchart illustrating a representative method for mobile network testing by using the prediction system of FIG. 3.

In general, the prediction system 20 is configured to perform a method for mobile network testing as illustrated in FIG. 4.

Thus, the prediction system 20 is generally configured to provide a prediction regarding the probability of at least one binary test result by running the machine learning model trained previously, for example wherein predictions regarding the probability of several binary test results are obtained from the prediction system 20.

For mobile network testing purposes, a single test is sufficient to be performed by using the at least one testing device 12, 22 as the machine learning model is trained appropriately. Then, the test result(s) of the single test performed is evaluated by the processing unit 14, for example the machine learning model. The test result(s) obtained by the single test may be assigned to the quality of a single service, for instance a certain mobile application.

This respective test result or rather the at least one network key performance indicator related thereto is forwarded to the processing unit 14, for example the machine learning model already trained, such that a prediction regarding the probability of binary test results with regard to a different service is outputted by the prediction system 20, for example the processing unit 14.

The machine learning model receives the at least one test parameter of the single test or the corresponding network key performance indicator(s) wherein the machine learning model was trained to predict the respective probabilities of binary test results of other services even though these services were not tested.

In general, the prediction system 20 is enabled to provide information (probability of binary test results) of different services even though a single test is performed that relates to a certain service as the machine learning model trained uses the test parameter(s) or rather the network key performance indicator(s) for evaluating purposes in order to predict the outcomes of other tests that were not run based on the test parameter(s) or rather the network key performance indicator(s).

As mentioned with regard to the test system 10, the at least one testing device 12, 22 may comprise the processing unit 14 so that the machine learning model can be run on the at least one testing device 12, 22 itself.

Accordingly, the network testing can be simplified due to the fact that the machine learning model has to be trained only once. As soon as the machine learning model has been trained appropriately, the network testing can be simplified significantly as only a single test has to be done in order to obtain information (probabilities of binary test results) from the machine learning model trained.

Therefore, the number of test procedures to be performed for mobile network testing can be reduced significantly which saves time and efforts.

Generally, the probability of binary test results may be assigned to the quality of the service which may correspond to the quality of experience.

The machine learning model provided by the feed-forward neural network is configured to predict the outcome of a test measurement sequence (test procedure) based on another test measurement sequence (test procedure). Thus, a single test measurement sequence (test procedure) is sufficient to predict the outcomes of several test measurement sequences (test procedures) when the machine learning model is trained.

For instance, the machine learning model receives the test results of a certain test parameter such as a drop call test. The machine learning model is configured to predict the results of another test parameter, for instance a video test, occurring at the same time and the same location (time information as well as geographic information are taken into account) without performing the tests of the other test parameter, namely a video test. Accordingly, the quality of several services can be predicted.

In some embodiments, one or more computer-readable storage media is provided containing computer readable instructions embodied thereon that, when executed by a computing device, such as the processing unit 14, perform one or more steps of the method of FIG. 4 described above.

Figure 5:
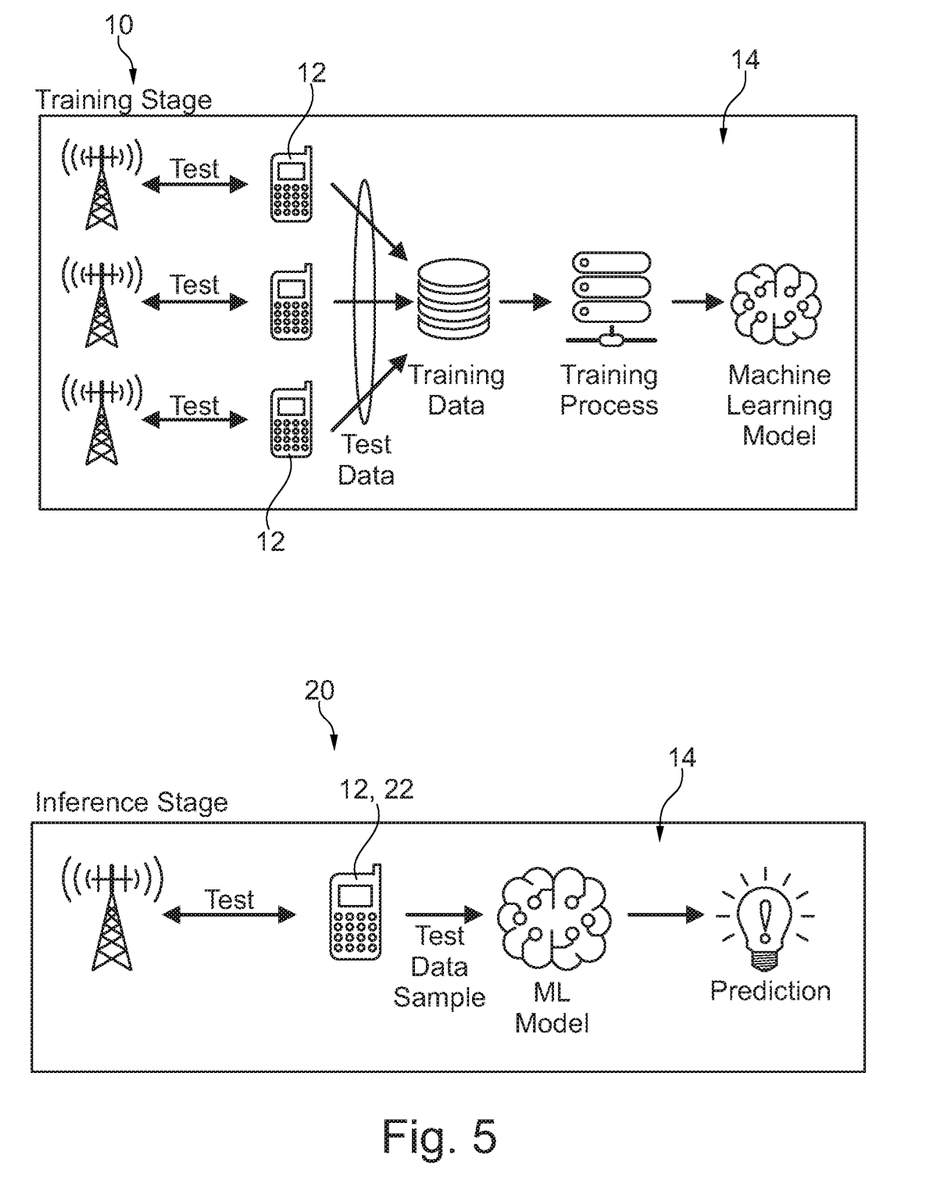
FIG. 5 shows a schematic overview illustrating a representative test system for mobile network testing according to the present disclosure and a representative prediction system according to the present disclosure.

In FIG. 5, a complete overview is shown that illustrates the test system 10 at the training stage and the prediction system 20 at the inference stage.

As indicated in FIG. 5, several test procedures are run on at least one testing device 12 or on several testing devices 12 for collecting test data used as training data for the machine learning model that is trained in a training process appropriately.

As shown for the training stage, the training process relates to inputting test parameter(s) or rather network key performance indicator(s) obtained from the test data, namely the test results of the respective test procedures, as well as the corresponding output parameters (binary test results) assigned to the quality of the respective service(s). Hence, pairs of information are used for the training corresponding to the supervised learning.

Once the machine learning model is trained, a single test is sufficient to provide information regarding other services as the machine learning model is enabled to predict the test results of test procedures with regard to other services appropriately based on the network key performance indicator(s) obtained from the single test. This is indicated on the right side of FIG. 5, namely at the inference stage.

Accordingly, it is not necessary to perform the several test campaigns with a large number of tests in order to obtain statistically significant test results being reliable.

The processing unit 14, for example, may be implemented as one or more microprocessors, microcomputers, microcontrollers, digital signal processors, central processing units, state machines, logic circuitries, and/or any devices that manipulate signals based on operational instructions. Among other capabilities, the processing unit 14 in some embodiments may be configured to fetch and execute computer-readable instructions stored in associated memory (not shown).

In some embodiments, the memory may comprise computer-readable media, for example, computer storage media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing or server device. The computer-readable media include cooperating or interconnected computer-readable media, which exist exclusively on a processing system or distributed among multiple interconnected processing systems that may be local to, or remote from, the processing system.

It should be appreciated that embodiments of the present disclosure, or portions thereof, may have been described in the general context of computer code or machine-useable instructions, including computer-executable instructions such as program modules, being executed by a computing system, or other machine or machines. Generally, program modules including routines, programs, objects, components, data structures, and the like refer to code that perform particular tasks or implement particular data types. Embodiments described herein may be implemented using a variety of system configurations, including handheld devices, consumer electronics, general-purpose computers, more specialty computing devices, etc. Embodiments described herein may also be implemented in distributed computing environments, using remote-processing devices that are linked through a communications network or the Internet.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or priviilege is claimed are defined as follows:

1. A method for mobile network testing by using at least one testing device configured to be connected to a mobile network as well as a processing unit, comprising:
   running a predefined set of test procedures on the at least one testing device in order to obtain binary test results assigned to at least one test parameter corresponding to at least one network key performance indicator, wherein the test procedures running on the at least one testing device simulate the behavior of participants of the mobile network with regard to at least one service;
   evaluating by the processing unit the binary test results of the test procedures received from the at least one testing device, wherein a machine learning model is used for evaluating purposes, the machine learning model being provided by a neural network; and
   training by the processing unit the machine learning model to predict the probability of at least one binary test result assigned to the quality of a respective service, wherein the training is based on the binary test results obtained by recognizing relationships and/or correlations between different data and/or information of the test parameter, wherein the training of the machine learning model is performed by using a series of test parameters together with the resulting binary test results assigned to the quality of the respective service as input parameters for the machine learning model.

2. The method according to claim 1, wherein calls, web browsing, video playing and/or downloads are simulated.

3. The method according to claim 1, wherein the machine learning model is trained to predict the probability of several binary test results based on the at least one test parameter.

4. The method according to claim 1, wherein the machine learning model is trained to predict statistical information.

5. The method according to claim 1, wherein the test parameters are investigated over time and/or wherein geographical information is taken into account.

6. The method according to claim 1, wherein the at least one test parameter corresponds network key performance indicators assigned to availability, health and/or performance.

7. The method according to claim 1, wherein the at least one test parameter corresponds to a voice call and/or data access, and/or wherein the at least one network key performance indicator corresponds to a drop call status, a fail call status, a video re- buffering status, data service accessibility, signal strength, signal to noise ratio, an interference ratio, latency, round trip time, jitter, bandwidth, throughput, failure rate, signal level and/or rebuffering.

8. The method according to claim 1, wherein the test results are evaluated on the testing device itself and/or wherein the test results are forwarded to a separate evaluation unit that evaluates the test results.

9. The method according to claim 1, wherein the machine learning model is provided by a feed-forward neural network.

10. A prediction system for predicting the probability of at least one binary test result, comprising a processing unit configured to run a machine learning model, wherein the machine learning model is trained by a method according to claim 1 or wherein the prediction system is configured to: perform a single test on the at least one testing device; forward the test result of the single test and the at least one test parameter assigned to the test result to the prediction system for evaluating the test result; and obtain a prediction regarding the probability of at least one binary test result from the prediction system, wherein the binary test results corresponding to test results classified into two groups on the basis of a classification rule.

11. A test system for mobile network testing, comprising at least one testing device and a processing unit configured to run a machine learning model to be trained, wherein the processing unit is configured to receive binary test results of a set of test procedures run on the at least one testing device, wherein the binary test results are assigned to at least one test parameter corresponding to at least one network key performance indicator, and wherein the processing unit is configured to evaluate the binary test results received from the at least one testing device, wherein the machine learning model is used for evaluating purposes, wherein the test procedures running on the at least one testing device simulate the behavior of participants of the mobile network with regard to at least one service, wherein the processing unit is configured to train the machine learning model to predict the probability of at least one binary test result assigned to the quality of a respective service based on the test results obtained by recognizing relationships and/or correlations between different data and/or information of the test parameter, and wherein the training of the machine learning model is performed by using a series of test parameters together with the resulting binary test results assigned to the quality of the respective service as input parameters for the machine learning model, wherein the machine learning model is provided by a neural network.

12. The test system according to claim 11, wherein the test system is configured to:
   run a predefined set of test procedures on the at least one testing device in order to obtain the binary test results assigned to the at least one test parameter.

13. A method for mobile network testing by using at least one testing device configured to be connected to a mobile network as well as a processing unit, the method comprising:
   providing a prediction system configured to predict the probability of at least one binary test result by running a trained machine learning model, wherein the machine learning model was trained by:
      running a predefined set of test procedures on at least one testing device in order to obtain binary test results assigned to at least one test parameter corresponding to at least one network key performance indicator, wherein the test procedures running on the at least one testing device simulate the behavior of participants of the mobile network with regard to at least one service;
      evaluating by the processing unit the binary test results of the test procedures received from the at least one testing device, wherein the machine learning model is used for evaluating purposes, the machine learning model being provided by a neural network; and training by the processing unit the machine learning model to predict the probability of at least one binary test result assigned to the quality of a respective service, wherein the training is based on the binary test results obtained by recognizing relationships and/or correlations between different data and/or information of the test parameter, wherein the training of the machine learning model is performed by using a series of test parameters together with the resulting binary test results assigned to the quality of the respective service as input parameters for the machine learning model, performing a single test on the at least one testing device, wherein the single test running on the at least one testing device simulates the behavior of participants of the mobile network with regard to a certain service;

forwarding the test result of the single test and the at least one test parameter assigned to the test result to the machine learning model of the prediction system for evaluating the test result, wherein the at least one test parameter corresponds to at least one network key performance indicator; and obtaining from the prediction system a prediction regarding the probability of at least one binary test result.

14. The method according to claim 13, wherein predictions regarding the probability of several binary test results are obtained from the prediction system.

15. The method according to claim 13, wherein the prediction system predicts the probability of binary test results assigned to different test parameters.

* * * * *